United States Patent
Dellock et al.

(10) Patent No.: US 10,106,076 B2
(45) Date of Patent: Oct. 23, 2018

(54) THREE MODE POLICE MIRROR

(71) Applicant: FORD GLOBAL TECHNOLOGIES, LLC, Dearborn, MI (US)

(72) Inventors: Paul Kenneth Dellock, Northville, MI (US); Stuart C. Salter, White Lake, MI (US); Doug H. Randlett, Metamora, MI (US); Matthew C. Mullen, New Hudson, MI (US); Christopher Charles Hunt, Livonia, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 194 days.

(21) Appl. No.: 15/043,753

(22) Filed: Feb. 15, 2016

(65) Prior Publication Data

US 2017/0232886 A1      Aug. 17, 2017

(51) Int. Cl.
*B60Q 1/26*      (2006.01)
*B60R 1/12*      (2006.01)
(Continued)

(52) U.S. Cl.
CPC .............. *B60Q 1/50* (2013.01); *B60Q 1/0076* (2013.01); *B60Q 1/2665* (2013.01);
(Continued)

(58) Field of Classification Search
CPC ....... B60C 1/0076; B60C 1/26; B60C 1/2661; B60C 1/2665; B60C 1/2696; B60C 1/50;
(Continued)

(56) References Cited

U.S. PATENT DOCUMENTS 5,619,375 A * 4/1997 Roberts ............... B60Q 1/2665
                                                    359/584
5,938,320 A    8/1999 Crandall
(Continued)

FOREIGN PATENT DOCUMENTS

CN       2868767 Y      2/2007
CN     203793222 U      8/2014
(Continued)

OTHER PUBLICATIONS

English machine translation of CN203793222U.
(Continued)

*Primary Examiner* — Jason Moon Han

(57) ABSTRACT

A warning indicator system for a vehicle side-view mirror includes light sources disposed to emit light in patterns and/or colors visible through a partially light-reflective surface. One or more processors are operatively configured to actuate the light sources in predetermined sequences defining a stealth mode, a pursuit mode, and a traffic advisor mode. The partially light-reflective surface may be a light transmitting substrate having a coating of a reflective substance provided in a thickness allowing at least a partial transmission of light therethrough. The light sources may be printed light-emitting diodes (LEDs). Disposing the light sources in desired patterns to emit desired colors on actuation in a predetermined sequence allows configuring the side mirrors to emit visible light signals indicative of the stealth mode, a pursuit mode, and a traffic advisor mode.

18 Claims, 6 Drawing Sheets

(51) Int. Cl.
 *B60Q 1/50* (2006.01)
 *B60Q 1/00* (2006.01)
 *F21S 43/14* (2018.01)
 *F21S 43/20* (2018.01)
 *B60Q 1/46* (2006.01)

(52) U.S. Cl.
 CPC .............. *B60Q 1/2696* (2013.01); *B60Q 1/46* (2013.01); *B60R 1/1207* (2013.01); *F21S 43/14* (2018.01); *F21S 43/255* (2018.01)

(58) Field of Classification Search
 CPC .......... B60C 1/503; B60C 1/52; F21S 48/215; F21S 48/217; F21S 48/218; F21S 48/2212; F21S 48/2218
 USPC .................................................. 362/487, 494
 See application file for complete search history.

(56) References Cited

U.S. PATENT DOCUMENTS

| | | |
|---|---|---|
| 5,938,322 A | 8/1999 | Alonzo, Jr. et al. |
| 6,072,391 A | 6/2000 | Suzuki et al. |
| 6,099,154 A | 8/2000 | Olney |
| 6,198,409 B1 | 3/2001 | Schofield et al. |
| 6,286,967 B1 | 9/2001 | Cainion |
| 6,388,565 B1 | 5/2002 | Bernhard et al. |
| 6,774,774 B2 | 8/2004 | Schofield et al. |
| 7,025,486 B2 | 4/2006 | Lang et al. |
| 7,186,005 B2 * | 3/2007 | Hulse ........................ F21S 4/20 362/231 |
| 7,222,977 B1 | 5/2007 | Darling |
| 7,229,197 B2 | 6/2007 | Tanaka et al. |
| 7,427,150 B2 | 9/2008 | Carter et al. |
| 7,477,137 B2 | 1/2009 | Matsumoto et al. |
| 7,581,859 B2 | 9/2009 | Lynam |
| 7,663,798 B2 | 2/2010 | Tonar et al. |
| 7,944,371 B2 | 5/2011 | Foote et al. |
| 8,022,818 B2 | 9/2011 | La Tendresse et al. |
| 8,072,351 B1 | 12/2011 | Absher, II |
| 8,740,427 B2 | 6/2014 | Fritz et al. |
| 8,749,371 B2 | 6/2014 | Moussa et al. |
| 8,793,909 B1 | 8/2014 | Cole |
| 8,833,987 B2 | 9/2014 | Lynam |
| 2001/0024371 A1 | 9/2001 | Pastrick et al. |
| 2005/0028411 A1 | 2/2005 | Yu |
| 2008/0079012 A1 | 4/2008 | Grote et al. |
| 2012/0147614 A1 | 6/2012 | Schmierer |
| 2014/0266666 A1 | 9/2014 | Habibi |

FOREIGN PATENT DOCUMENTS

| | | |
|---|---|---|
| DE | 102011106838 A1 | 1/2013 |
| KR | 2014137807 A | 12/2014 |
| WO | 2004024502 A2 | 3/2004 |

OTHER PUBLICATIONS

English machine translation of CN2868767Y.
English machine translation of DE102011106838A1.
English machine translation of KR2014137807A.
"2x Blue 14-SMD LED Arrow Panels for Car Side Mirror Turn Signal Indicator Lights"; http://www.ebay.com/itm/2x-Blue-14-SMD-LED-Arrow-Panels-for-Car-Side-Mirror-Turn-Signal-Indicator-Lights-/252081553299; printed Dec. 4, 2015; pp. 1-6.

* cited by examiner

THREE MODE POLICE MIRROR

TECHNICAL FIELD

This disclosure relates generally to warning signals for motor vehicles. More particularly, the disclosure relates to a warning indicator system for a public service vehicle side mirror providing various signalling modes.

BACKGROUND

For many public service vehicles there is a need for lighting systems capable of operation in various easily recognizable modes. For example, service vehicles such as police vehicles may require the capacity to operate their lighting systems in at least Stealth, Pursuit, and Traffic Advisor modes. In Stealth mode, to be inconspicuous the vehicle is operated without activating auxiliary lighting such as the traditional red and blue flashing light bar with which most police vehicles are equipped. In Pursuit mode, the user activates the flashing red and blue light bar to advertise that the vehicle is on the way to an emergency or in pursuit of another vehicle, and that the public should take steps to avoid impeding the service vehicle's progress. In Traffic Advisor mode, when the vehicle is deployed to regulate traffic flow such as at an accident site or a construction site, a separate light bar included in the vehicle may be activated to exhibit a sequentially actuated pattern, for example flashing yellow arrows or chevrons, to advise oncoming traffic to merge left or right.

Such conventional flashing light bars are most typically situated centrally on the police vehicle, for example on the vehicle roof for the flashing red and blue light bar and at a rear of the vehicle for the traffic control light bar. Front and rear lighting including headlights, brake lights, and running lights may also be configured to actuate intermittently to attract attention as part of the emergency lighting system, for example when the flashing red and blue light bar is activated. Most service vehicles are not provided with other supplemental lighting systems. At most, some supplemental lighting indicative of the above-described modes may be disposed on the vehicle side mirror skull cap, and so is only effective as a warning to persons situated forward of the police vehicle.

While the above-discussed lighting systems are effective for their intended purpose, the public can benefit from supplemental lighting systems providing the same warnings. This is similar in principle to the practice of positioning warning signals such as turn signal indicators in or on side view mirrors disposed at the outboard extremities of a vehicle, to supplement the main turn signal warning indicators and thereby to increase the likelihood of attracting the attention of nearby vehicular and pedestrian traffic. The present disclosure satisfies this need in the art by providing a side-view mirror provided with a warning indicator system configured to emit visible, recognizable light signals in Stealth, Pursuit, and Traffic Advisor modes. Advantageously, the disclosed side mirrors are relatively un-complex in design and do not require bulky electronics for operation.

SUMMARY

In accordance with the purposes and benefits described herein, in one aspect a warning indicator system for a vehicle side-view mirror is described including a plurality of light sources disposed to emit light in patterns and/or colors visible through a partially light-reflective surface. One or more processors are operatively configured to actuate the light sources in a plurality of predetermined sequences defining a stealth mode, a pursuit mode, and a traffic advisor mode. In embodiments, the partially light-reflective surface is a light transmitting substrate having a coating of a reflective substance disposed on one side thereof, the coating having a thickness allowing at least a partial transmission of light therethrough.

In embodiments, the plurality of light sources are provided by printed light-emitting diodes (LEDs) disposed adjacent the reflective coating whereby at least a portion of the light emitted by the printed LEDs passes through the reflective coating and the light transmitting substrate. In embodiments, one or more layers of a phosphor dye are interposed between the reflective coating and the printed LEDs to alter a color of light emitted by the printed LEDs. In stealth mode, the printed LEDs are not actuated. In pursuit mode, the one or more processors are configured to actuate in sequence a first printed LED design emitting light of a first color and a second printed LED design emitting light of a second color that is the same as or different from the first color. In traffic advisor mode, the one or more processors are configured to sequentially actuate one or more printed LED designs to provide a traffic warning.

In the following description, there are shown and described embodiments of the disclosed warning indicator system. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed warning indicator system, and together with the description serve to explain certain principles thereof. In the drawing.

Reference will now be made in detail to embodiments of the disclosed warning indicator system, examples of which are illustrated in the accompanying drawing figures.

DETAILED DESCRIPTION

To address the foregoing and other identified problems, the present disclosure describes a warning indicator system provided by means of light sources disposed behind a partially reflective surface of a side-view mirror assembly. At a high level, the described warning indicator system is configured to provide visible and recognizable light patterns indicative of a Stealth mode, a Pursuit mode, and a Traffic Advisor mode to supplement other lighting systems used to indicate such modes as summarized above.

Preliminarily, vehicle side view mirrors are well-known in the art, and do not require extensive discussion herein. Briefly, as is known such mirrors typically include at least a housing or skull cap and a reflective substrate, positioned at the outboard extremities of the vehicle whereby the driver can conveniently use them to determine whether a vehicle or pedestrian is approaching her vehicle from the rear and side. It is also known to provide such side mirrors with other conveniences, such as motorized systems to allow adjusting the mirror angles to the driver's liking from a switch disposed in the vehicle passenger cabin, actuable lights providing visible signals indicative of various functions such as turn signal indicators, proximity alerts, and others. Such actuable lights may be disposed on the mirror skull cap or behind the reflective substrate. For positioning behind the reflective substrate, conventionally the lights must be disposed adjacent to a light transmitting opening in the reflective substrate. Alternatively, the reflective substrate may comprise a light filter allowing light of a certain wavelength to pass through, and the lights must emit light in a wavelength that can pass through that filter.

To solve the above-summarized and other problems, the present disclosure describes a side-view mirror assembly including a warning indicator system configured to operate in a Stealth mode, a Pursuit mode, and a Traffic Advisor mode. The side-view mirror assembly is described in the context of a police vehicle in this disclosure. However, this will not be considered to be limiting, as the skilled artisan will readily appreciate that the described warning indicator system is easily adaptable to other public service vehicles, for example fire departments, municipal department of transportation vehicles, and others.

Figure 1:
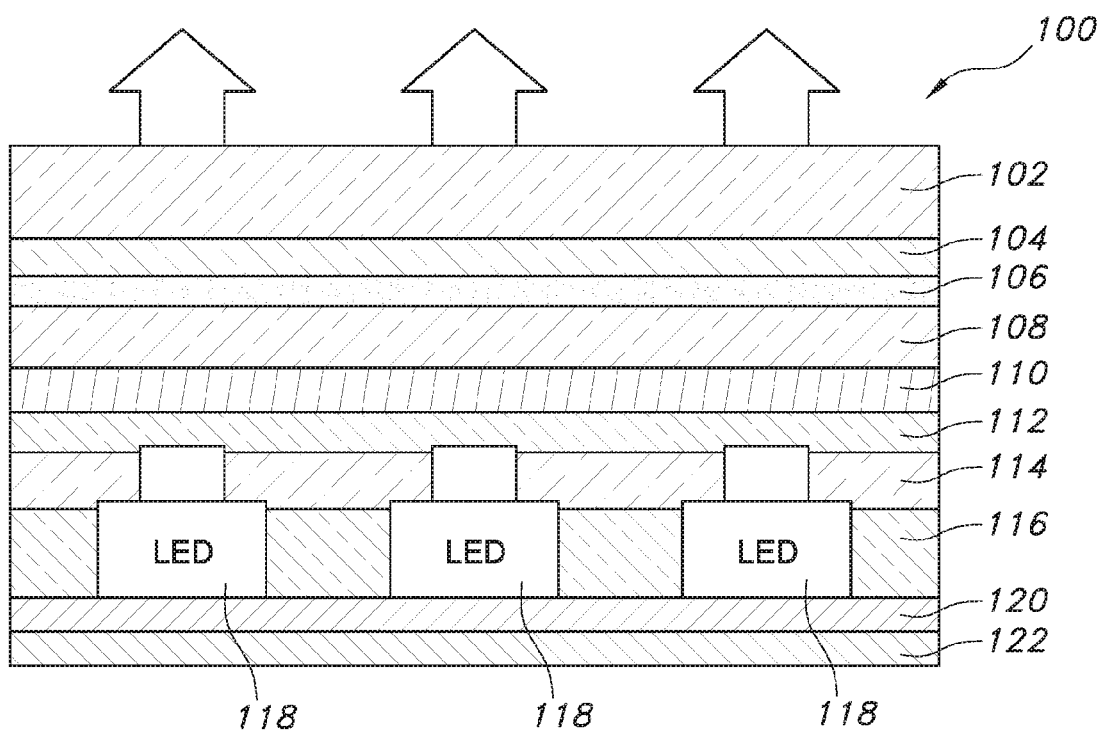
FIG. 1 depicts a printed LED indicator according to the present disclosure.

With reference to FIG. 1, in one embodiment a side-view mirror assembly 100 is provided. The assembly 100 includes a substantially transparent light transmitting substrate 102 such as glass or a polymer, and a partially reflective coating 104, in combination providing a reflective mirror surface similar to a two-way mirror. As will be appreciated, the partially reflective coating 104 hides the light sources (described below) when they are not activated. A variety of substances are known for use in providing a partially reflective or semi-transparent coating for a substrate allowing non-specific transmission of light therethrough in appropriate circumstances, including without limitation silver, aluminum, indium, chromium, nickel, acrylic other alloys, and combinations.

An adhesive layer 106 may be included to adhere other elements to a rear side of the partially reflective coating 104. This may be a coating of a suitable adhesive, two-sided adhesive tape, etc. A clear substrate layer 108 may be interposed between the adhesive layer 106 and light sources (see description below). This may be an optically clear plastic film, an optically clear adhesive, etc., providing a surface that can be printed on.

Figure 2:
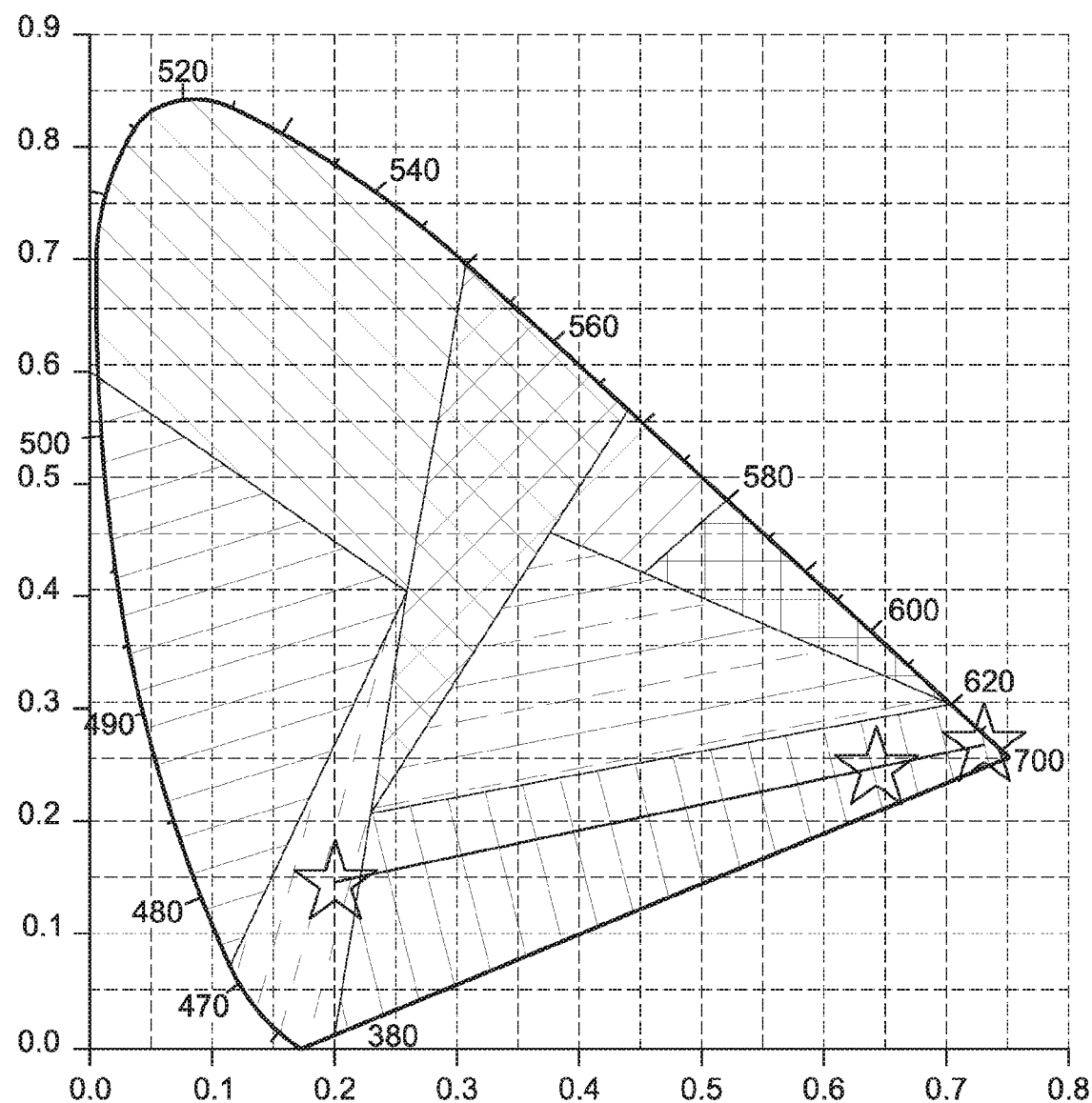
FIG. 2 graphically depicts shifting of blue light emitted by printed LEDs to reds and yellows by use of phosphor dyes.

In the depicted embodiments, the light sources are provided by printed LEDs optionally overlaid by a layer of a suitable phosphor or other dye, which in combination cause emission of light in a desired color. For reasons of cost effectiveness it is known to use printed LEDs emitting a blue color, overlaid with a suitable phosphor or other dye to alter the color of the light emitted by the printed LEDs. As non-limiting examples, rylene phosphor and/or YAG phosphor dyes are used to change the color emitted by portions of the printed blue LEDs. As is known in the art, rylene and other phosphor dyes can be applied to shift the blue light wavelengths emitted by blue LEDs to other desired color wavelengths, such as red and yellow wavelengths (see FIG. 2). However, it will be appreciated that multiple colors of LED could be used to create desired designs/colored light emission as the technology advances.

Continuing, in the depicted embodiment shown in FIG. 1 one or more layers 110 of a phosphor dye may be included providing, in combination with the light emitted by blue printed LEDs, a desired color. The phosphor dye layers 110 are deposited on a transparent conductive layer 112, which is turn adjacent to one or more transparent dielectric layers 114. A random diode ink (RDI) layer or layers 116 containing a plurality of LEDs 118 suspended in the ink is printed on the conductive layer 112, creating one or more LED "decals" providing a desired color and/or pattern of light emission, such as a chevron or other desired shape. A conductive ink layer or layers 120 carries an electrical charge to the LEDs 118 included in the RDI layer 116. Finally, an insulating base 122 is provided to serve as a base substrate for the printed LED, protecting and sealing the assembly from water, chemicals, dirt, etc. This may be fabricated of any suitable material such as MYLAR, polyester, or any suitable plastic or polymer film to which the conductive ink layer 120 can adhere. In combination, these layers provide a vertically connected diode array that is randomly spaced, and in which printed LEDs 118 are arranged to define a shape which is visible as a correspondingly configured emitted light shape/color through the light transmitting substrate 102/partially reflective coating 104 (see arrows) when an electrical charge is supplied to the LEDs 118 of the RDI layer 116.

Figure 3:
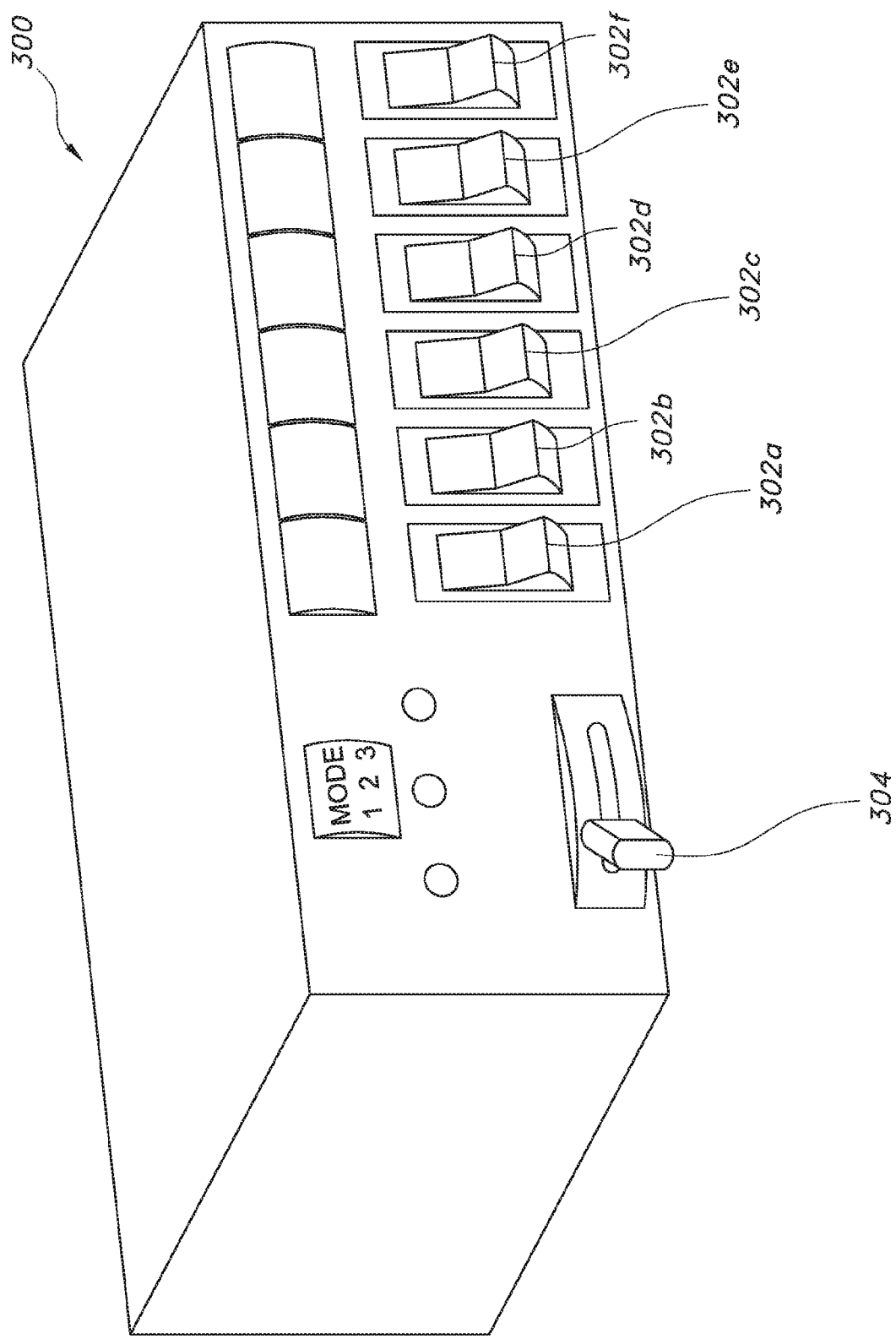
FIG. 3 depicts a control box for a warning indicator system according to the present disclosure.

In an embodiment, the above-described construct is used to provide a side-view mirror-mounted warning indicator defined by a plurality of printed LED shapes, for providing a supplemental warning indicator to the vehicle in Stealth, Pursuit, and Traffic Advisor modes. One or more controllers are provided for controlling actuation of the printed LEDs, for example microcontrollers housed in a conventional three-mode police lighting control box 300 as shown in FIG. 3. As is known, such control boxes include a variety of switches 302a . . . 302n for actuating various lighting systems of the vehicle, for example the red and blue flashing emergency light bar and traffic advisor light bars described above. The control box 300 also includes a mode switch 304 for placing the vehicle emergency lighting systems in one of Stealth, Pursuit, and Traffic Advisor mode (Modes 1, 2, 3 in the drawing) as described above. In Stealth mode, the vehicle emergency lighting systems are not activated, allowing the police vehicle to proceed as inconspicuously as possible.

Figure 4:
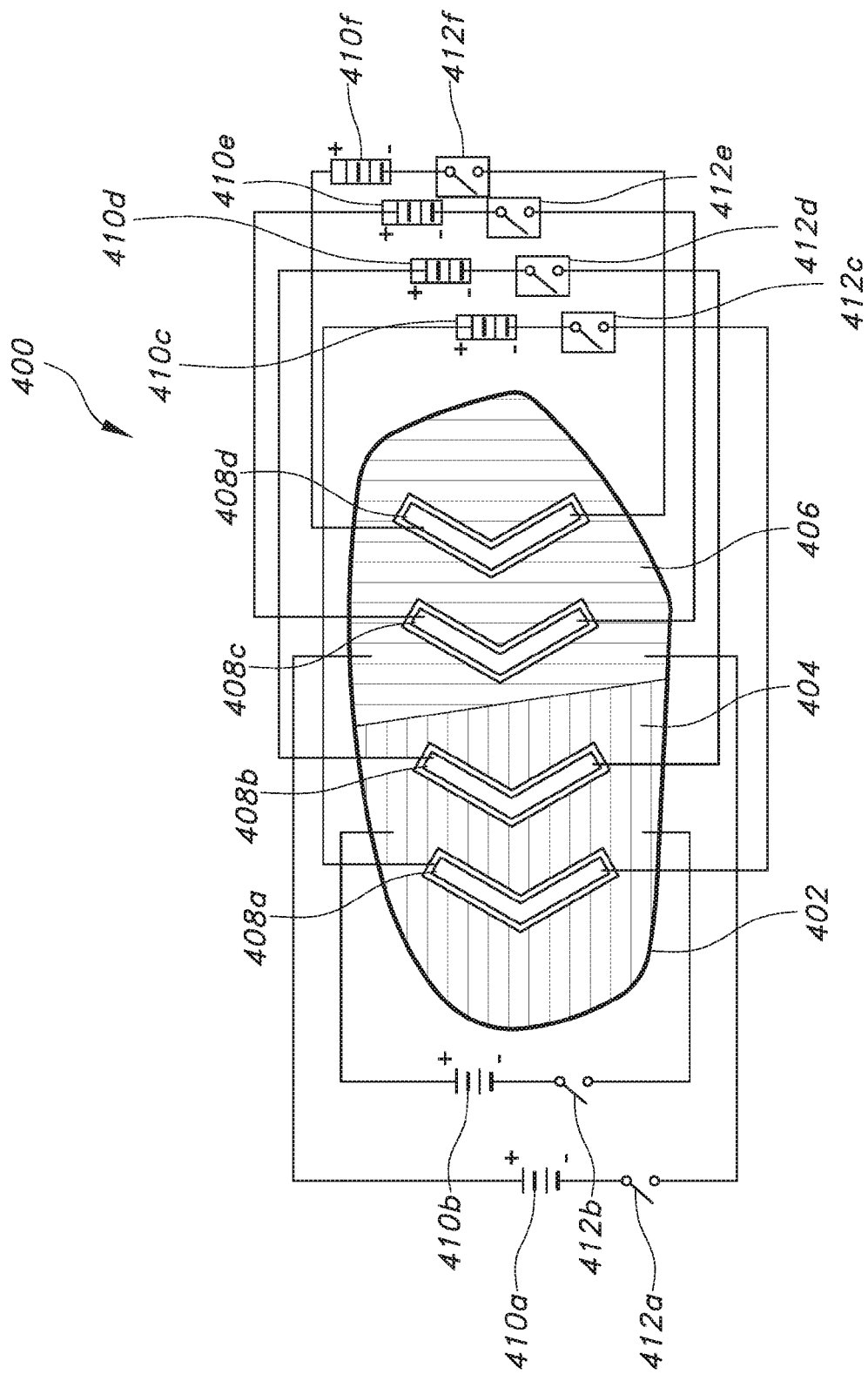
FIG. 4 depicts a basic circuit for a warning indicator system according to the present disclosure.

A representative circuit for controlling actuation of the printed LEDs 118 in Pursuit and Traffic Advisor modes is depicted in FIG. 4. As shown in the drawing figure, a side view mirror construct 400 substantially as described and shown in FIG. 1 is provided, including a housing or skull cap 402, a reflective surface (not shown in this view for convenience), and a plurality of printed LEDs arrayed as described above to form particular shapes 404, 406, and 408a, 408b, 408c, and 408d. Each LED shape is provided with a controller 410a . . . 410n controlling a cooperating switch 412a . . . 412n. As will be appreciated, each controller 410n is configured to actuate its cooperating switch 412n in a predetermined sequence/pattern, whereby the controlled LED shape is actuated as desired.

In the depicted embodiments, shapes 404 and 406 each respectively underlie a separate portion of the side view mirror 400 reflective surface. Shape 404 is provided by a plurality of printed LEDs which when actuated emit a blue light shape 404 under a first portion of the reflective surface. Shape 406 is provided by a plurality of printed LEDs which when actuated emit a red light shape 406 under a second portion of the reflective surface. In the depicted embodiment, as described above the blue light shape 404 may be provided by printed blue LEDs, and the red light shape 406 may be provided by printed blue LEDs overlaid by a suitable layer or layers of phosphor dye causing the light wavelength emitted by the blue LEDs to shift to the red wavelength.

Shapes 408a . . . 408n are provided by disposing printed LEDs in a desired pattern, in the depicted embodiment being a plurality of chevrons disposed under the side mirror 400 reflective surface and emitting a yellow light. In the depicted embodiment, as described above the yellow light shapes 408a . . . 408n may be provided by printed blue LEDs in the desired chevron patterns, overlaid by a suitable layer or layers of phosphor dye causing the light wavelength emitted by the blue LEDs to shift to the yellow wavelength.

Figure 5A:
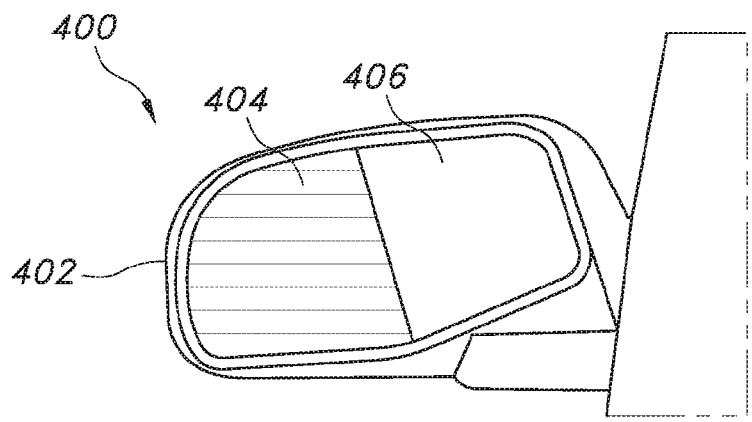
FIG. 5A depicts a first step of activation of a side mirror including the warning indicator system of the present disclosure in Pursuit mode.
Figure 5B:
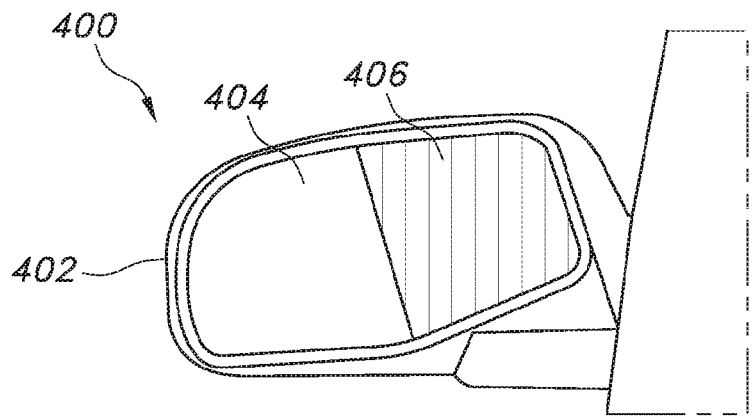
FIG. 5B depicts a next step of activation of a side mirror including the warning indicator system of the present disclosure in Pursuit mode.
Figure 5C:
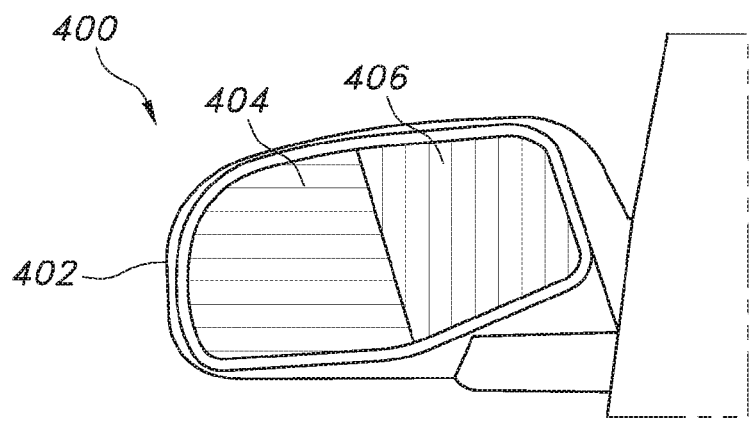
FIG. 5C depicts a final step of activation of a side mirror including the warning indicator system of the present disclosure in Pursuit mode.
Figure 6A:
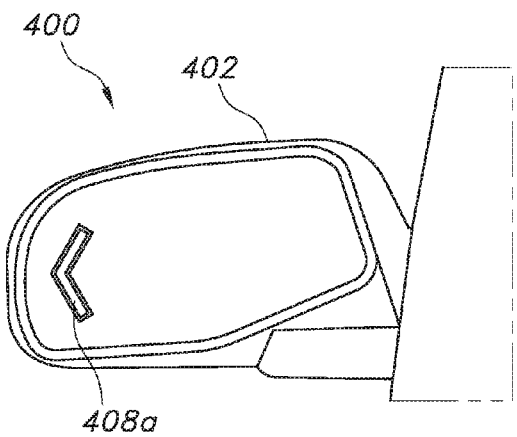
FIG. 6A depicts a first step of activation of a side mirror including the warning indicator system of the present disclosure in Traffic Advisor mode.
Figure 6B:
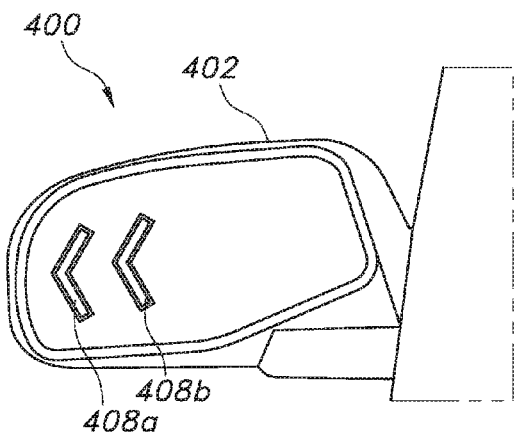
FIG. 6B depicts a next step of activation of a side mirror including the warning indicator system of the present disclosure in Traffic Advisor mode.
Figure 6C:
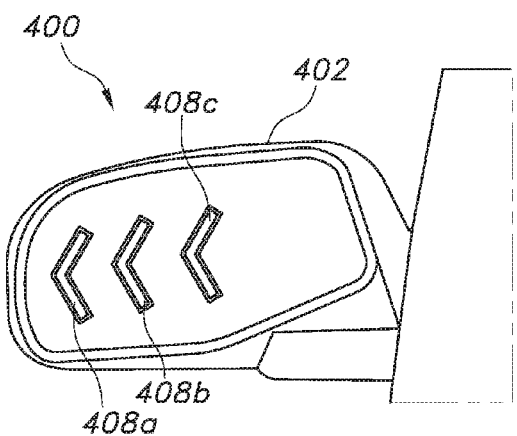
FIG. 6C depicts a next step of activation of a side mirror including the warning indicator system of the present disclosure in Traffic Advisor mode.
Figure 6D:
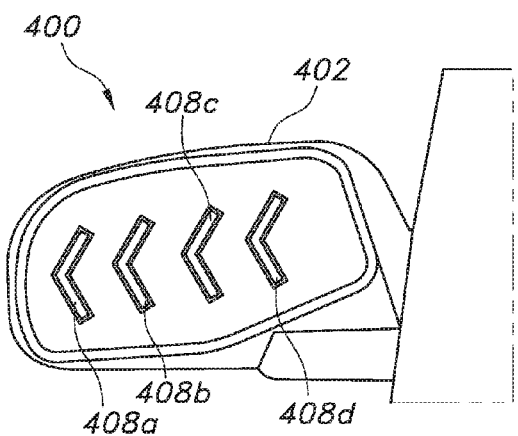
FIG. 6D depicts a final step of activation of a side mirror including the warning indicator system of the present disclosure in Traffic Advisor mode.

By the foregoing structures, side mirrors 400 emitting light in recognizable patterns indicative of Pursuit and Traffic Advisor modes are provided. With reference to FIGS. 5A-5C, the blue shape 404 and the red shape 406 are caused by the controllers/switches (not visible in this view) to actuate intermittently a particular pattern recognizable by the public as associated with a vehicle in Pursuit mode, i.e. a repeated sequence of actuating blue shape 404 (FIG. 4A), then actuating red shape 406 (FIG. 4B), then actuating blue shape 404 and red shape 406 concurrently (FIG. 4C), and repeating.

Likewise, with reference to FIGS. 6A-6D, the yellow shapes 408a . . . 408n are used to provide side mirrors 400 emitting light in recognizable patterns indicative of a vehicle in Traffic Advisor mode. In the depicted example, a "Merge Left" signal is provided by sequentially actuating yellow chevron shapes 408a through 408d to provide the illusion of an animated display, alerting the public to merge to the left of the vehicle. Of course, the opposite patterns would be provided for the opposed, right side-view mirror 400 (not shown) to provide a "Merge Right" signal.

Accordingly, by the foregoing description a side-mirror mounted warning indicator system for a vehicle is provided, to supplement existing vehicle lighting systems indicative of Stealth, Pursuit, and Traffic Advisor modes. Advantageously, by providing animated patterns of particular, recognizable light colors within the vehicle side mirrors, the function of alerting the public is enhanced because animated light patterns are more likely to attract attention as is known. Still more, by the described technology using printed LEDs disposed below partially reflective surfaces of the side view mirror constructs, overly complex electrical systems are avoided. Likewise, because the side mirror lighting constructs as described are low profile, large and bulky side mirror housings accommodating complex and bulky electronics are not required. Still yet more, printed LED technology provides hundreds of LEDs spread in an even pattern. This provides a much smoother light pattern compared to conventional LED technology which typically uses arrays of 5-7 LEDs to create a turn signal indicator, creating a choppy surface to the pattern that does not lend itself to smooth animation.

Obvious modifications and variations are possible in light of the above teachings. All such modifications and variations are within the scope of the appended claims when interpreted in accordance with the breadth to which they are fairly, legally and equitably entitled.

What is claimed:

1. A warning indicator system for a vehicle side-view mirror, comprising:
   a transparent conductive layer;
   a plurality of printed light-emitting diodes (LEDs) printed on the transparent conductive layer to define a plurality of designs;
   one or more photoluminescent portions deposited on the transparent conductive layer to provide, in combination with light emitted by the plurality of printed LEDs, one or more light colors;
   a conductive layer disposed to provide an electric charge to the plurality of printed LEDs; and
   one or more processors operatively configured to actuate the plurality of printed LEDs in a plurality of predetermined sequences providing, in combination with the one or more photoluminescent portions, a plurality of visible light patterns and/or colors indicating at least a pursuit mode and a traffic advisor mode.

2. The system of claim 1, further including a partially light-reflective surface comprising a light transmitting substrate having a coating of a reflective substance disposed on one side thereof, the coating having a thickness allowing at least a partial transmission of light therethrough.

3. The system of claim 2, wherein the reflective substance comprises a reflective element or compound selected from one of silver, aluminum, indium, chromium, nickel, alloys thereof, or acrylic.

4. The system of claim 2, wherein the plurality of printed LEDs is disposed adjacent the reflective coating whereby at least a portion of the light emitted by the printed LEDs passes through the reflective coating and the light transmitting substrate.

5. The system of claim 4, wherein the one or more photoluminescent portions each comprise a phosphor dye interposed between the reflective coating and the printed LEDs to alter a color of light emitted by the printed LEDs.

6. The system of claim 1, wherein in stealth mode the printed LEDs are not actuated.

7. The system of claim 1, wherein in pursuit mode the one or more processors are configured to actuate in sequence a first printed LED design emitting light of a first color and a second printed LED design emitting light of a second color that is the same as or different from the first color.

8. The system of claim 1, wherein in traffic advisor mode the one or more processors are configured to sequentially actuate one or more printed LED designs to provide a traffic warning.

9. The system of claim 8, wherein the one or more printed LED designs are configured as one or both of a chevron and an arrow.

10. A warning indicator system for a vehicle side-view mirror, comprising:
- a light-transmitting substrate having a coating of a reflective substance disposed on one side thereof, the coating having a thickness allowing at least a partial transmission of light therethrough;
- a transparent conductive layer;
- a plurality of printed light-emitting diodes (LEDs) suspended in a random diode ink and printed on the transparent conductive layer to define a plurality of LED designs;
- one or more photoluminescent portions deposited on the transparent conductive layer to provide, in combination with light emitted by the plurality of printed LEDs, one or more light colors;
- a conductive ink layer disposed to provide an electric charge to the plurality of printed LEDs; and
- one or more processors operatively configured to actuate the plurality of printed LEDs in one or more predetermined sequences to emit light through the one or more photoluminescent layers in a plurality of visible light patterns and/or colors indicating at least a pursuit mode and a traffic advisor mode.

11. The system of claim 10, wherein the reflective substance comprises a reflective element or compound selected from one of silver, aluminum, indium, chromium, nickel, alloys thereof, or acrylic.

12. The system of claim 10, wherein the one or more photoluminescent portions each comprise a phosphor dye interposed between the reflective coating and the printed LEDs to alter a color of light emitted by the printed LEDs.

13. The system of claim 10, further including a stealth mode wherein the printed LEDs are not actuated.

14. The system of claim 10, wherein in pursuit mode the one or more processors are configured to actuate in sequence a first printed LED design emitting light of a first color and a second printed LED design emitting light of a second color that is the same as or different from the first color.

15. The system of claim 10, wherein in traffic advisor mode the one or more processors are configured to sequentially actuate one or more printed LED designs to provide a traffic warning.

16. The system of claim 15, wherein the one or more printed LED designs are configured as one or both of a chevron and an arrow.

17. The system of claim 10, including a housing holding the light-transmitting substrate.

18. A vehicle including a side-view mirror comprising the system of claim 10.

* * * * *